United States Patent Office 2,785,912
Patented Mar. 19, 1957

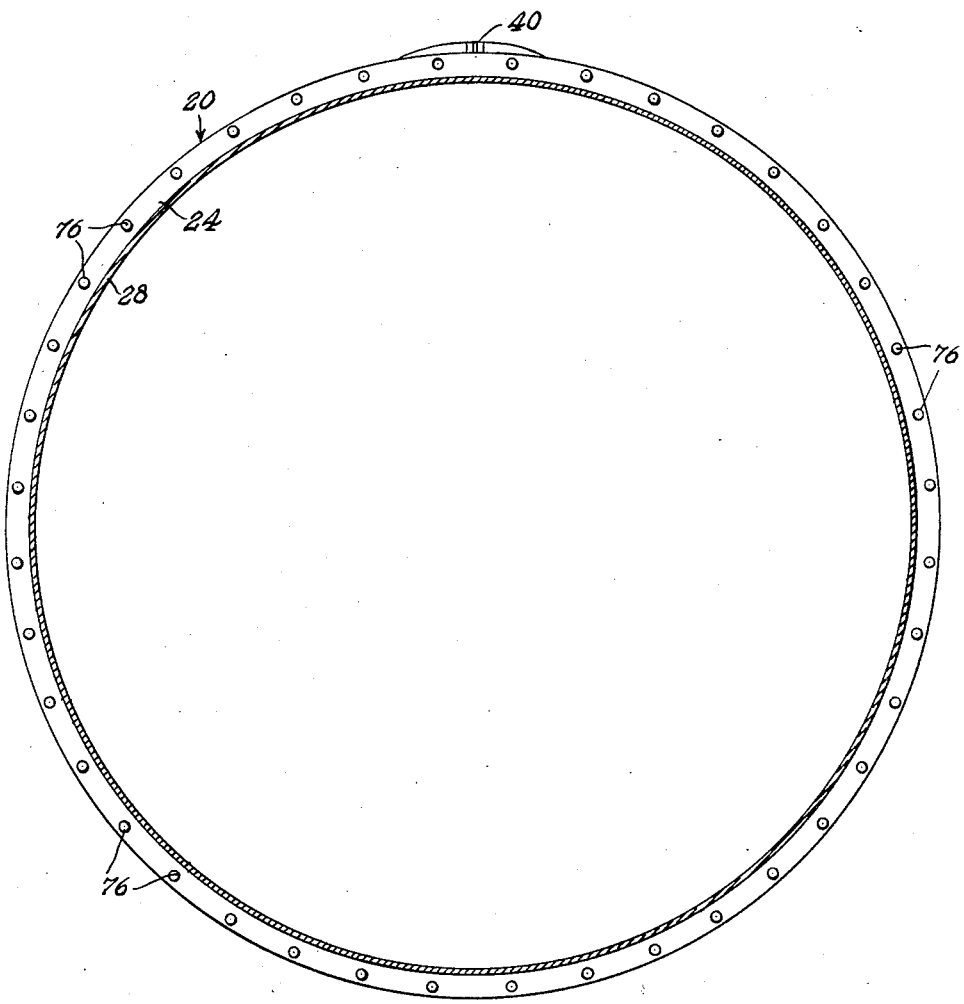

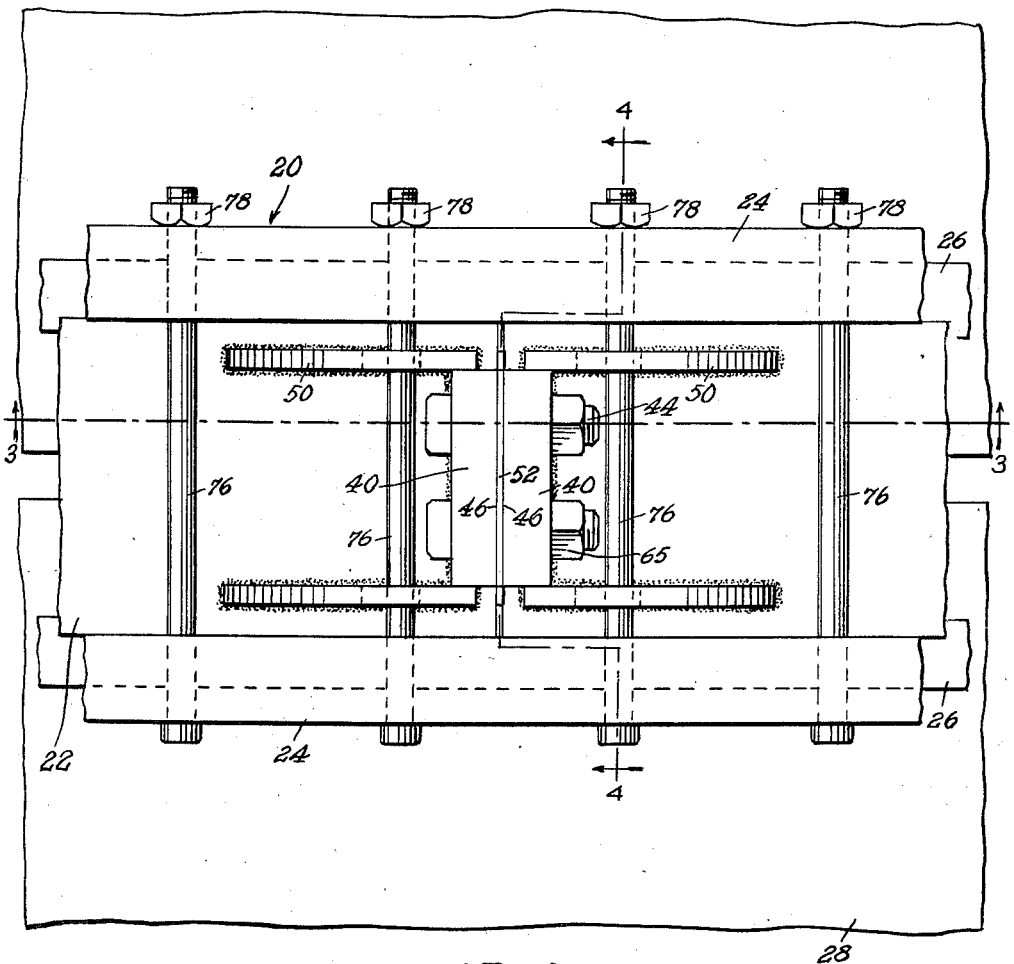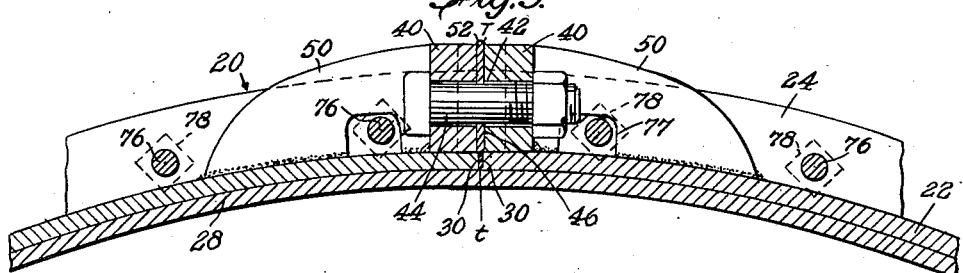

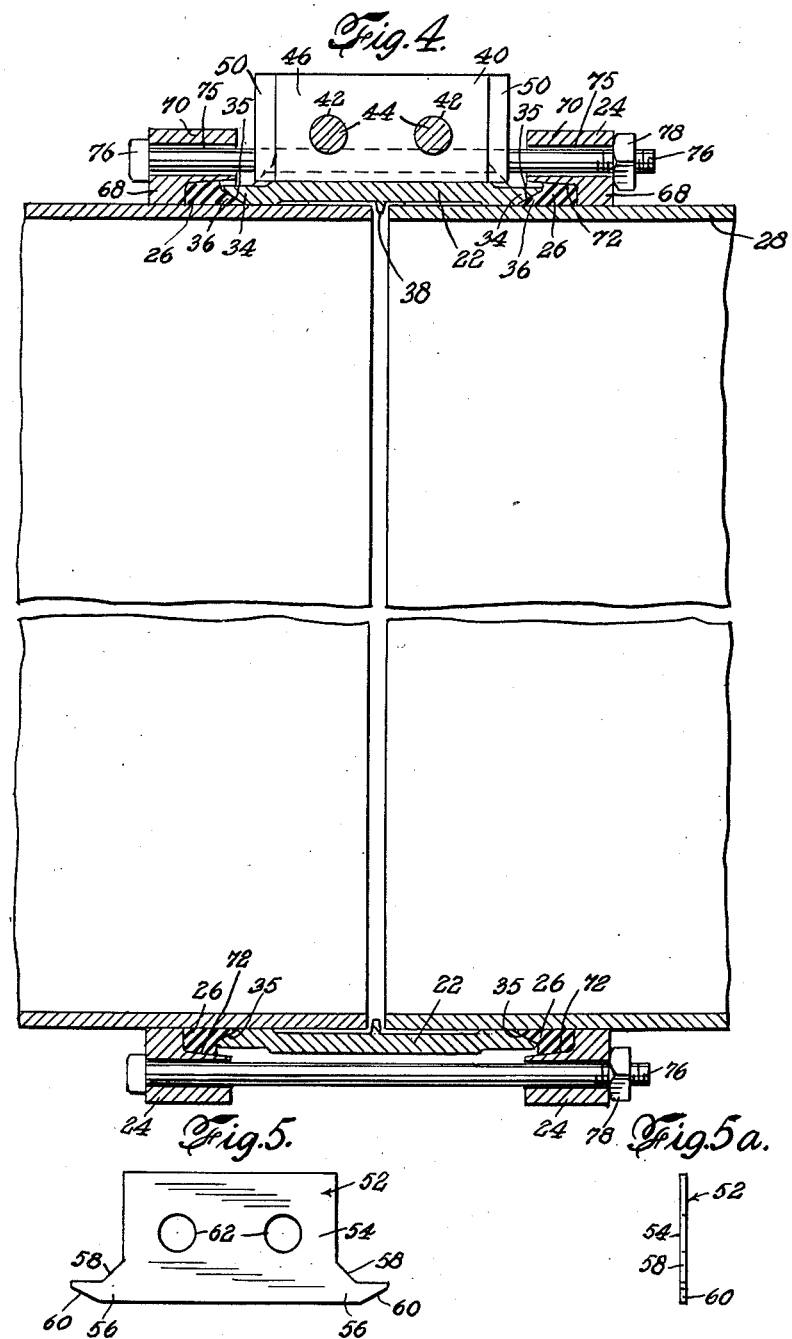

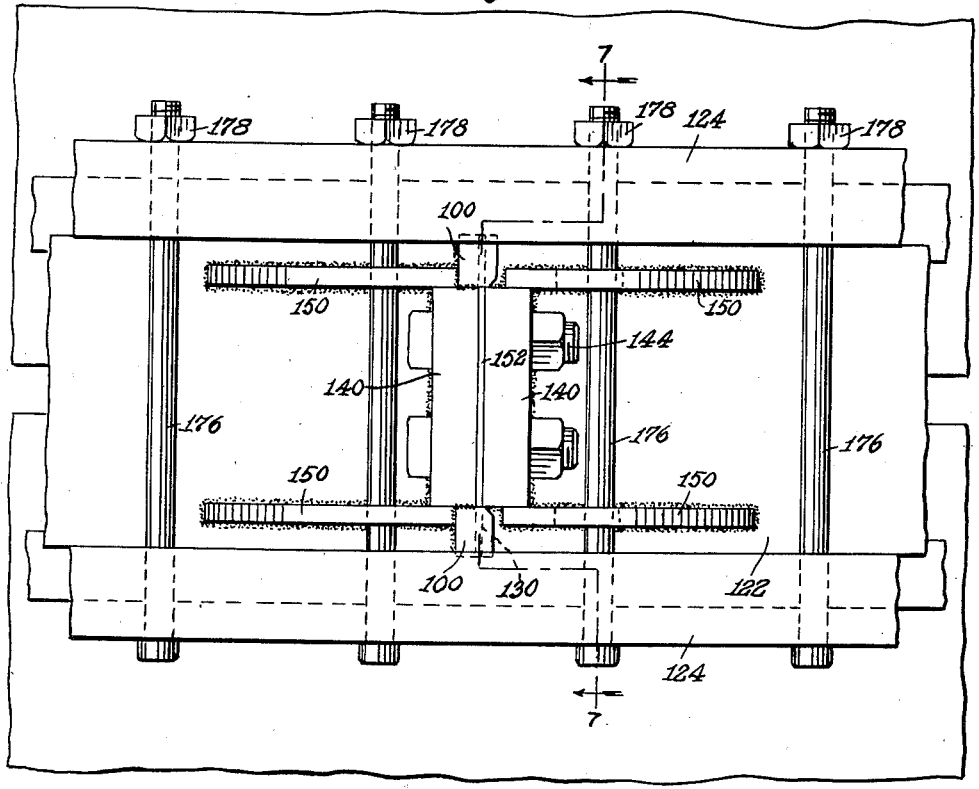
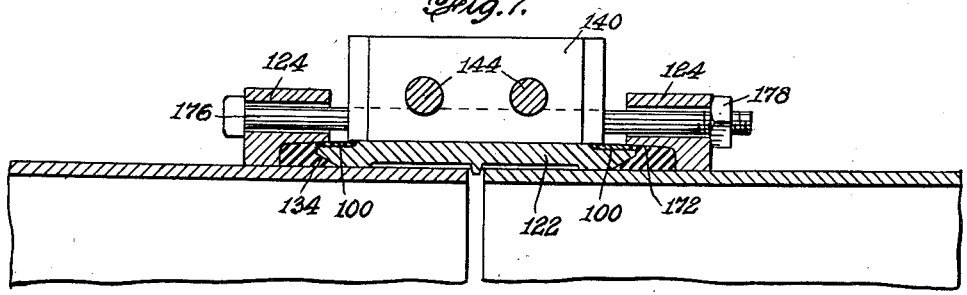
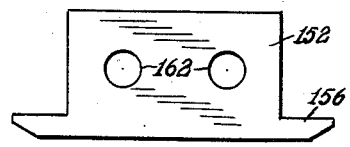

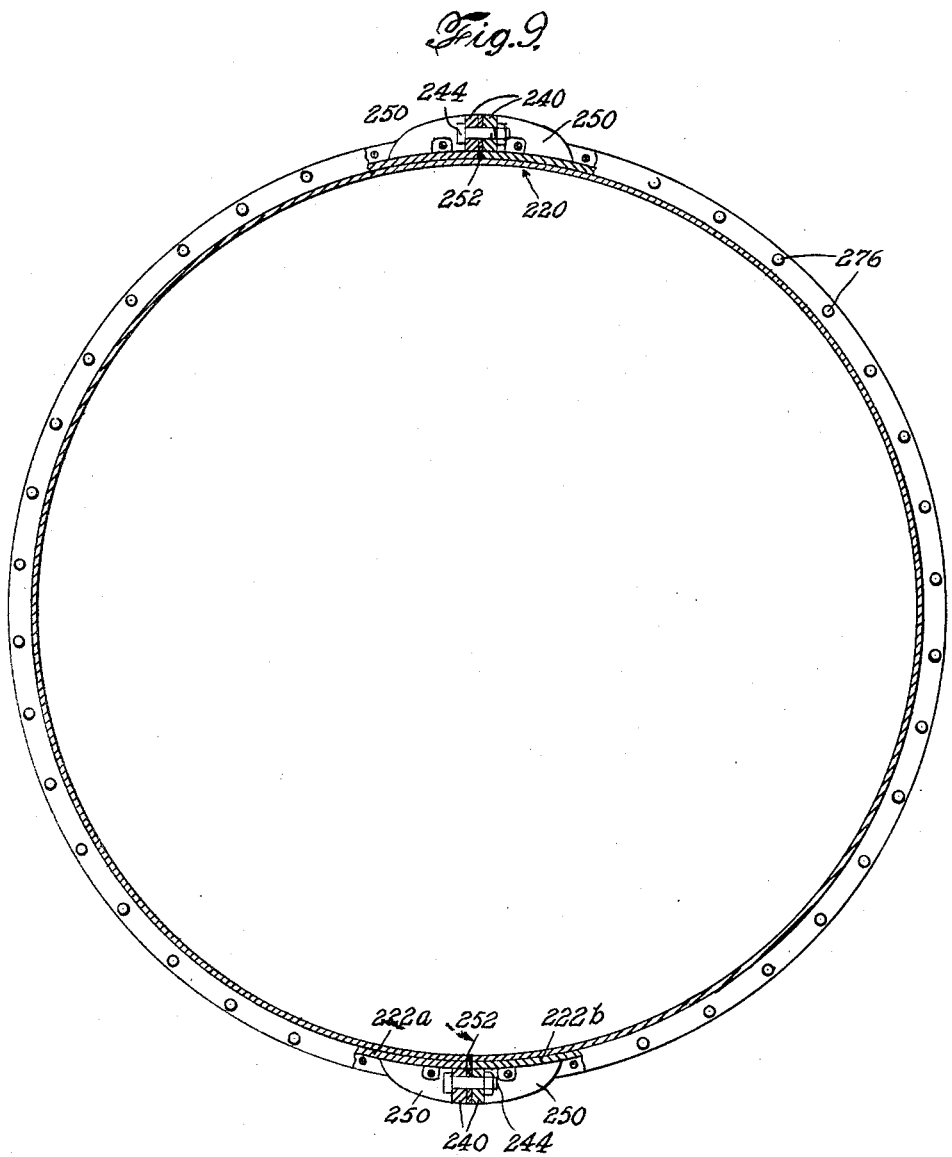

2,785,912

EXTERNALLY PACKED SLEEVE TYPE PIPE COUPLING

Roger E. Risley and George D. Kish, Bradford, Pa., assignors to Dresser Industries, Inc., a corporation of Delaware Application October 30, 1951, Serial No. 253,834

9 Claims. (Cl. 285—337)

This invention relates to a pipe coupling and while not necessarily restricted thereto, is primarily concerned with a pipe coupling for large diameter pipes. The expression "large diameter" is generally understood to mean pipe sizes approximately 4 feet and larger although features of the present invention are applicable to pipes of smaller sizes.

Pipe used for the long distance transmission of oil, gas, water and other fluids, is formed in sections of specified length which are interconnected by means of couplings which permit a certain amount of expansion and contraction of the pipe sections and are sufficiently flexible to permit a limited amount of bending of the pipe sections at the joint.

In the case of large diameter pipe, special problems arise in connection with the provision of a suitable coupling without increasing its weight unduly, since large heavy couplings are not only difficult and expensive to handle but require a large amount of material for their manufacture. Various proposals have, therefore, been made which aim at providing a coupling for large diameter pipe which is less massive than the couplings which would result if couplings which are used on small diameter pipe were proportionally increased to a size suitable for use on large diameter pipe. In the usual type of pipe coupling for small and medium size pipe, a continuous cylindrical sleeve or middle ring is provided and gaskets, which are compressed by suitable gasket follower members, are employed to form a fluid-tight seal between the edges of the middle ring and the surface of the pipe sections upon which it is mounted. In the construction of couplings for large diameter pipe, however, advantageous and practical relatively lightweight couplings have been designed which employ a "split" sleeve, the sleeve being transversely separated in one or more points. Since the sleeve must prevent escape of fluid from the line if the coupling is to be effective, it is obvious that the split portions of the sleeve must be suitably joined in fluid-tight relationship when the coupling is assembled. Various arrangements for effecting a fluid-tight seal between the sections of the middle ring have been proposed and are satisfactory in varying degrees. In some cases, however, they are not effective to the degree desired and it is sometimes necessary to install the coupling very carefully with experienced and skilled labor to obtain effective fluid-tightness.

It is the principal object of the present invention to provide an improved coupling of the split sleeve type.

It is another object of the invention to provide a coupling of the character indicated wherein the split portions of the sleeve are constructed in such manner that fluid-tightness of the joint is increased.

It is another object of the invention to provide a pipe coupling of the split sleeve type which does not require skilled labor for its installation.

It is another object of the invention to provide a gasket of novel construction for joining the edges of the split sleeve of a pipe coupling in fluid-tight relationship.

It is another object of the invention to provide a pipe coupling split sleeve of improved construction.

In accordance with the invention, I provide a coupling which is particularly suitable for joining sections of large diameter pipe in fluid-tight relationship, comprising a sleeve or middle ring which is split along at least one transverse line, the edges of the sleeve portions adjacent the transverse split being provided with bolt receiving side bars spaced inwardly from the sides of the sleeve and receiving between them a side bar gasket having a portion substantially coextensive with the split edge of the middle ring, gasket members for sealing the sides of the middle ring cooperating with the side bar gasket, and follower means for compressing the side gasket members.

It is a feature of the preferred form of the improved coupling of the invention that the side bars at the split edges of the sleeve are spaced inwardly from the split edge to a predetermined extent to facilitate and insure optimum sealing action of the side bar gasket between the opposed split edges of the sleeve when the side bars are drawn together.

It is another feature of the preferred form of the improved coupling of the invention that the follower members are provided with radial extensions which overlie a portion of the middle ring when the followers are drawn up to compress the side gaskets.

In a preferred form of the invention, the side bars are also provided with extensions adapted to overlie the portion of the side bar gasket extending between the split edges of the sleeve beyond the side bars.

Other objects and features of the invention will be readily apparent from the following detailed description of illustrative embodiments of the invention, and from the accompanying drawings wherein:

Fig. 1 is an end view of a coupling embodying features of the present invention;

Fig. 2 is a fragmentary plan view on an enlarged scale of the coupling of Fig. 1 showing the construction of the joint between the split edges of the middle ring;

Fig. 3 is a sectional view, partly in elevation, taken approximately along the line 3—3 of Fig. 2;

Fig. 4 is a sectional view, partly in elevation, taken approximately along the line 4—4 of Fig. 2;

Fig. 5 is an elevational view of the side bar gasket used in the coupling shown in Fig. 1;

Fig. 5a is an end view of the gasket shown in Fig. 5;

Fig. 6 is a fragmentary plan view of a modified form of the coupling shown in Fig. 1;

Fig. 7 is a sectional view, partly in elevation, taken approximately along the line 7—7 of Fig. 6;

Fig. 8 is an elevational view of the side bar gasket shown in Fig. 6, and

Fig. 9 is an end elevational view of another embodiment of the coupling of the invention.

Referring to the drawings, and more particularly to Figs. 1, 2 and 4, the numeral 20 designates generally a coupling constructed in accordance with the invention and comprising a split central sleeve or middle ring 22 and follower rings 24 which serve to compress gaskets 26 into sealing engagement between the lateral edges of the middle ring 22 and the external surfaces of the pipe sections 28 upon which the coupling is installed to provide a leak-proof joint between the two pipe sections.

In the embodiment illustrated in Figs. 1, 2, 3 and 4, the sleeve or middle ring 22 is split axially at one point of its circumference to provide oppositely-disposed transverse edges 30. The lateral edges 34 of the middle ring 22 are formed with inwardly tapered surfaces 35 which define gasket recesses 36 in which the inner edges of the gaskets 26 are received. A pipe stop 38 is provided centrally of the middle ring 22 to limit the extent to which each of the pipe sections 28 may be inserted in the middle ring during installation. While the middle ring 22 is relatively flexible to facilitate installation of the coupling, the invention is not limited to a construction having any specified degree of flexibility.

When the coupling is installed, it is of course necessary for the transverse split in the middle ring to be sealed against escape of fluid from the pipe sections 28. It is a feature of the construction of the split middle ring of the invention that a particularly effective fluid-tight seal is obtained at all times. Thus, referring particularly to Figs. 2, 3 and 4, the middle ring is provided adjacent the transverse edges 30 with outwardly extending radial side bars 40 which are provided with aligned apertures 42 for receiving clamping bolts 44. It will be observed by reference to Fig. 3, that the oppositely-disposed forward faces 46 of the side bars 40 are spaced circumferentially-inwardly from the transverse edges 30 of the middle ring 22 to a slight extent. Thus, if the distance between the edges 30 is designated $t$ and the distance between the faces 46 of the side bars 40 is designated T, then T will be greater than $t$. It will also be observed that the side bars 40 do not extend the entire axial distance across the middle ring 22 but are spaced inwardly from the lateral edges 34. The side bars 40 are reinforced and strengthened by circumferentially extending reinforcing webs or gussets 50 which, as shown in the embodiment illustrated, have an arcuate outer surface extending substantially from the outer edge of the side bars 40 to the surface of the middle ring 22. The gussets 50 are welded or otherwise secured to the side edges of the side bars 40, as shown in Fig. 2.

The seal between the faces 46 of the side bars 40 and the transverse edges 30 of the middle ring 22 is effected by means of a gasket member 52 shown in detail in Fig. 5. As illustrated, the gasket 52 has a substantially rectangular body portion 54 and outwardly extending arms 56 adjacent the lower edge of body portion 54, the juncture between the arms 56 and the side walls of body portion 54 being along a sloped or tapered surface 58. It will be seen that the arms 56 have an outline corresponding to the outline of the transverse edges of the middle ring 22 with an inwardly sloping lower surface 60 corresponding to the inwardly sloping surfaces 35 which define the gasket recesses 36. The body portion 54 of the side bar gasket 52 is formed with two apertures 62 which coincide with apertures 42 in the side bars 40 when the gasket is placed in position between the side bars. It will thus be seen that the gasket 52 has a portion substantially coextensive with the side bar faces and a portion substantially coextensive with the adjacent transverse end edges.

As shown in Fig. 5a, the side bar gasket 52 is a relatively thin sheet-like member and is formed from rubber or rubber composition, this term being used generically to include natural and synthetic rubbers and elastomeric compounds, or compositions having like properties and characteristics. The material is relatively firm and solid but sufficiently resilient and elastic to flow under pressure to conform to the surfaces between which it is confined. Thus, the side bar gasket 52 may be formed from vulcanized natural rubber, neoprene (polychloroprene), GR-S (butadiene-styrene copolymer), GR-A (butadiene-acrylonitrile copolymer) and the like.

When the middle ring 22 is installed, it is positioned around the ends of the pipe sections 28 as shown in Fig. 4 and the bolts 44, which extend through the apertures 42 of the side bars 40 and the apertures 62 of the gasket 52 positioned between the side bars, are then tightened by means of nuts 65 to compress the gasket 52 to form a fluid-tight seal. The lower end of the body portion 54 and the outwardly extending arms 56 of the side bar gasket 52 are positioned between the opposed faces of the transverse edges 30. Since the space $t$ between the transverse edges 30 is less than the distance T between the faces of the side bars 40, the portion of the gasket 52 between the transverse edges 30 will be compressed to a greater extent than the remainder of the gasket and fluid-tightness will be obtained at the point at which it is more important, i. e. along the entire surface of the transverse edges 30, the seal being obtained automatically without any particular skill on the part of the person installing the coupling.

As previously mentioned, the fluid-tight seal along the lateral edges 34 of the split middle ring 22 is obtained by means of the gaskets 26 which are compressed and urged into sealing relationship by means of the follower rings 24. As shown in Fig. 4, the follower rings 24 have an annular body portion 68 and an inwardly directed radial flange 70 which forms with the body portion 68 a gasket recess 72, the flange 70 being sufficiently long that when the follower rings 24 are drawn up to compress the gaskets 26, the flange 70 will overlie a portion of the outer surface of the middle ring 22. The follower rings 24 are provided with aligned apertures 75 through which extend the bolts 76 which are used to draw the follower rings 24 toward one another. As will be seen in Fig. 3, the gussets 50 are provided with openings 77 to permit passage of the bolts 76. When the follower rings 24 are drawn up by tightening the nuts 78 upon the bolts 76, the gaskets 24 are compressed and displaced laterally inwardly into sealing relationship with the outer surface of pipe sections 28 and the side bar gasket 52. Thus the arms 56 of the side bar gasket 52 merge with the gaskets 26 to form a continuous seal. While gaskets 26 may be of any convenient form, they are suitably cut from a straight strip of material or molded to a circular or semi-circular form with the meeting ends formed to effect a butt joint. Alternately, the ends of the gaskets 26 may be formed with overlapping tapered surfaces. The gaskets 26, like the side bar gasket 52, are formed from rubber or rubber composition which is relatively firm and solid but sufficiently resilient and elastic to flow under pressure to conform to the surfaces between which it is confined.

In a preferred embodiment of the invention there are advantageously provided means for insuring against displacement of the arms 56 of the side bar gasket 52, particularly when high pressure fluids are passed through the pipe line upon which the coupling is installed. Referring to Fig. 6, wherein parts corresponding to those shown in Figs. 1, 2, 3, 4, 5 and 5a have been given the same reference numerals with the addition of 100, there is shown an embodiment of the invention which is formed with a side bar gasket-retaining member secured to the split middle ring adjacent one transverse edge thereof.

As will be seen in Figs. 6 and 7, relatively thin strips 100 are secured by welding or other convenient means to one end of the middle ring 122 and to the adjacent side bar 140 and reinforcing gusset 150. The strips 100 are of sufficient length and width to extend at least to the lateral edge 134 of the middle ring 122 and to extend substantially beyond the transverse edge 130 with which they are associated to overlie the opposite end of the middle ring 122 when the side bars 140 are brought together by the bolts 144, and thus to overlie the space $t$ in which are seated the arms 156 of the side bar gasket 152. There is provided a slight clearance between the upper surface of the strips 100 and the outer surfaces of the gasket recesses 172 defined by the follower rings 124 to permit the strips to slide into the gasket recesses 172 when the followers 124 are drawn up by the bolts 176. The strips 100 are formed from steel or other light, relatively strong yet somewhat flexible material. Stainless steel has been found to be particularly suitable. It will be apparent that the strips 100 are held securely in place in the installed coupling and effectively prevent radial displacement of the arms 156 of the side bar gasket 152. As shown in Fig. 8, the gasket 152 does not have the sloping surface between its body portion 154 and the arms 156 that is present in gasket 52 shown in Fig. 5, but instead these portions of the gasket are joined along a substantially right angle in order that the arms 156 will be received more easily into the space below the strips 100.

While in the embodiments above described, the middle ring has a single transverse split and thus is in the form of a split ring, the present invention is equally applicable to middle rings having more than one transverse split, for example a middle ring formed from two semi-circular ring segments. Thus as shown in Fig. 9, wherein parts corresponding to those shown in Fig. 1 have been given the same reference numerals with the addition of 200, there is shown a middle ring 222 formed from two semi-circular ring segments 222a and 222b. Each end of the ring segments is provided with a side bar 240 which cooperates with the corresponding side bar on the opposed edge of the other ring segment. The side bars are provided with reinforcing gussets 250 and are sealed by a side bar gasket member 252, in the manner above described in connection with the embodiment of Fig. 1. It will be apparent that in like manner the middle ring and the coupling may be formed with three or more splits as desired. In each case the opposed portions of the ring segments are constructed in the manner shown in the above described embodiments and the ring segments are joined in fluid-tight relationship by means of a side bar gasket having the characteristics of the above-described gaskets 52.

A feature of the invention is that the portion of the side gasket 52, 152 that lies between the side bars 40, 140 limits the movement of the side bars toward one another when the side bolts are tightened and thereby prevents excessive compression or pinching of the portion of the gasket between the edges 30, 130 of the middle ring 22, 122. The distance the side bars are set back from the edges 30, 130 of the middle ring is preferably such that when the side bolts have been tightened the distance $t$ between the edges 30, 130 of the middle ring is between 35% and 65% of the distance $T$ between the oppositely disposed forward faces of the side bars 40, 140. While the thickness of the side gasket in uncompressed condition may vary to some extent depending on the gasket material, middle ring size and line pressure, it is of the order of 1/8 to 3/8 inch.

It will also be apparent that various other changes and modifications may be made in the embodiments above-described and shown in the accompanying drawings without departing from the scope of the invention as defined in the appended claims and it is intended therefore that all matter contained in the foregoing description and in the drawings shall be interpreted as illustrative and not in a limiting sense.

What we claim and desire to secure by Letters Patent is:

1. A pipe coupling comprising, in combination, a cylindrical sleeve having at least one axial split defining substantially parallel transverse edge portions, a bolt-receiving side bar extending radially outwardly from said sleeve adjacent each of said transverse edge portions, said side bars having continuous planar faces and being of lesser axial width than the width of said transverse edge portions and being provided with bolt-receiving apertures, the face of at least one of said side bars being circumferentially spaced from the adjoining transverse edge portion of the sleeve, whereby the opposed faces of said side bars are circumferentially spaced apart a greater distance than the transverse edge portions of the sleeve, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split.

2. A pipe coupling comprising, in combination, a cylindrical sleeve having at least one axial split defining substantially parallel transverse edge portions, a bolt-receiving side bar extending radially outwardly from said sleeve adjacent each of said transverse edge portions, each side bar having a continuous planar face spaced circumferentially inwardly from said edge portions, whereby the opposed faces of said side bars are circumferentially spaced-apart a greater distance than the transverse edge portions of the sleeve, and these side bars being provided with bolt-receiving apertures, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split.

3. A pipe coupling comprising, in combination, a cylindrical sleeve having at least one axial split defining substantially parallel transverse edge portions, a bolt-receiving side bar extending radially outwardly from said sleeve adjacent each of said transverse edge portions, said side bars having a continuous planar face spaced circumferentially inwardly from said edge portions, whereby the opposed faces of said side bars are circumferentially spaced-apart a greater distance than the transverse edge portions of the sleeve, and these side bars being provided with bolt-receiving apertures and being of lesser axial width than the width of said transverse edge portions, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split.

4. A pipe coupling comprising, in combination, a cylindrical sleeve having at least one axial split defining substantially parallel transverse edge portions, a bolt-receiving side bar extending radially outwardly from said sleeve adjacent each of said transverse edge portions and being provided with bolt-receiving apertures, said side bars having continuous planar faces and being of lesser axial width than the width of said transverse edge portions, the face of at least one of said side bars being circumferentially spaced from the adjoining transverse edge portion of the sleeve, whereby the opposed faces of said side bars are circumferentially spaced-apart a greater distance than the transverse edge portions of the sleeve, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, means for drawing together said side bars to compress said side bar gasket between said side bars and between said transverse edge portions of the sleeve to seal the axial split, and means overlying the portions of said side bar gasket means extending outwardly beyond said side bars.

5. A pipe coupling comprising, in combination, a cylindrical sleeve having at least one axial split defining substantially parallel transverse edge portions, a bolt-receiving side bar extending radially outwardly from said sleeve adjacent each of said transverse edge portions and being provided with bolt-receiving apertures, said side bars having continuous planar faces and being of lesser axial width than the width of said transverse edge portions, the face of at least one of said side bars being circumferentially spaced from the adjoining transverse edge portion of the sleeve, whereby the opposed faces of said side bars are circumferentially spaced-apart a greater distance than the transverse edge portions of the sleeve, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar basket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, means for drawing together said side bars to compress said side bar gasket between said side bars and between said transverse edge portions of the sleeve to seal the axial split, and thin metal strips secured to said sleeve overlying the portions of said side bar gasket means extending outwardly beyond the said side bars.

6. A pipe coupling comprising, in combination, a cylindrical sleeve having at least one axial split defining substantially parallel transverse edge portions, a bolt-receiving side bar extending radially outwardly from said sleeve adjacent each of said transverse edge portions and being provided with bolt-receiving apertures, said side bars having continuous planar faces and being of lesser axial width than the width of said transverse edge portions, the face of at least one of said side bars being circumferentially spaced from the adjoining transverse edge portion of the sleeve, whereby the opposed faces of said side bars are circumferentially spaced-apart a greater distance than the transverseedge portions of the sleeve, edge gasket means positioned along the side edges of said sleeve, follower means disposed axially outwardly of said gasket means and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, means for drawing together said side bars to compress said side bar gasket between said side bars and between said transverse edge portions of the sleeve to seal the axial split, and thin metal strips secured to said sleeve overlying the portions of said side bar gasket means extending outwardly beyond the said side bars, said strips being of sufficient length to be overlapped by said follower means when said first-named gaskets are compressed.

7. In a pipe line comprising a pair of coaxial pipe sections, a coupling connecting the opposed ends of said pipe sections in fluid-tight relationship, said coupling comprising, in combination, a cylindrical sleeve having at least one axial split defining substantially parallel transverse edge portions, a bolt-receiving side bar extending radially outwardly from said sleeve adjacent each of said transverse edge portions and being provided with bolt-receiving apertures, said side bars having continuous planar faces and being of lesser axial width than the width of said transverse edge portions, the face of at least one of said side bars being circumferentially spaced from the adjoining transverse edge portion of the sleeve, whereby the opposed faces of said side bars are circumferentially spaced-apart a greater distance than the transverse edge portions of the sleeve, edge gasket means positioned along the side edges of said sleeve, follower means disposed axially outwardly of said gasket means, and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bare faces with apertures registering with said first-named apertures and a portion substantially coextensive with the adjacent transverse edge portions of the coupling sleeve and extending outwardly beyond the side edge of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split.

8. In a pipe line comprising a pair of coaxial pipe sections, a coupling connecting the opposed ends of said pipe sections in fluid-tight relationship, said coupling comprising, in combination, a cylindrical sleeve having at least one axial split defining substantially parallel transverse edge portions, a bolt receiving side bar extending radially outwardly from said sleeve adjacent each of said transverse edge portions and being provided with bolt receiving apertures, each side bar having a continuous planar face spaced circumferentially inwardly from said edge portions, whereby the opposed faces of said side bars are circumferentially spaced-apart a greater distance than the transverse edge portions of the sleeve, and the side bars being of lesser axial width than the width of said transverse edge portions, edge gasket means positioned along the side edges of said sleeve, follower means disposed axially outwardly of said gasket means, and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first-named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split.

9. In a pipe line comprising a pair of coaxial pipe sections, a coupling connecting the opposed ends of said pipe sections in fluid-tight relationship, said coupling comprising, in combination, a cylindrical sleeve having at least one axial split defining substantially parallel transverse edge portions, a bolt receiving side bar extending radially outwardly from said sleeve adjacent each of said transverse edge portions and being provided with bolt-receiving apertures, each side bar having a continuous planar face spaced circumferentially inwardly from said edge portions, whereby the opposed faces of said side bars are circumferentially spaced-apart a greater distance than the transverse edge portions of the sleeve, and the side bars being of lesser axial width than the width of said transverse edge portions, edge gasket means positioned along the side edges of said sleeve, follower means disposed axially outwardly of said gasket means, and means for drawing said follower means toward the axial center of said sleeve to compress said gasket means, said follower means having extensions overlying the outer edges of said sleeve when compressing said gasket means, side bar gasket means positioned between the opposed continuous planar faces of the side bars at the transverse split, said side bar gasket means being of substantially uniform thickness and having a portion substantially coextensive with the side bar faces with apertures registering with said first named apertures and a portion substantially coextensive with the adjacent transverse edge portions of the coupling sleeve and extending outwardly beyond the side edges of said first-named portion of the side-bar gasket means, said last-named portion of the side-bar gasket means lying between said transverse edge portions of the sleeve and merging with said edge gasket means at each side edge of said sleeve, and means for drawing together said side bars to compress said side bar gasket between said side bars and between said transverse edge portions of the sleeve to seal the axial split, and means overlying the portions of said side bar gasket means extending outwardly beyond the said side bars.

References Cited in the file of this patent
UNITED STATES PATENTS

| | | |
|---|---|---|
| 186,435 | Parsons | Jan. 23, 1877 |
| 1,689,052 | Rogers | Oct. 23, 1928 |
| 1,877,094 | Walborn | Sept. 13, 1932 |
| 1,940,729 | Pfefferle | Dec. 26, 1933 |
| 2,009,744 | Pfefferle | July 30, 1935 |
| 2,374,574 | Adams | Apr. 24, 1945 |
| 2,648,551 | Risley | Aug. 11, 1953 |